United States Patent [19]

Mitachi et al.

[11] 4,380,588
[45] Apr. 19, 1983

[54] GLASS FOR INFRARED RAY-TRANSMITTING OPTICAL FIBERS AND OPTICAL FIBERS FORMED FROM SAID GLASS

[75] Inventors: Seiko Mitachi; Shuichi Shibata; Terutoshi Kanamori; Toyotaka Manabe, all of Mito; Mitsuho Yasu, Katsuta, all of Japan

[73] Assignee: Nippon Telegraph & Telephone Public Corporation, Tokyo, Japan

[21] Appl. No.: 340,057

[22] Filed: Jan. 18, 1982

Related U.S. Application Data

[62] Division of Ser. No. 226,716, Jan. 21, 1981, Pat. No. 4,343,638.

[30] Foreign Application Priority Data

Feb. 4, 1980 [JP] Japan .................................. 55-11531

[51] Int. Cl.³ .......................... C03C 3/18; C03C 3/30
[52] U.S. Cl. ...................................... 501/37; 501/40; 501/904
[58] Field of Search ............................ 501/40, 904, 37

[56] References Cited

U.S. PATENT DOCUMENTS

| 2,819,977 | 1/1958 | De Paolis ............................ 501/40 |
| 4,141,741 | 2/1979 | Lucas et al. ......................... 501/40 |
| 4,308,066 | 12/1981 | Mitachi et al. ..................... 501/40 |

FOREIGN PATENT DOCUMENTS

| 2396981 | 2/1979 | France ............................. 350/96.34 |
| 56-9245 | 1/1981 | Japan ................................... 501/40 |

OTHER PUBLICATIONS

Mitachi et al., "Fluoride Glass Fiber for Infrared Transmission", Japanese Journal of Applied Physics, vol. 19, No. 6, Jun. 1980, pp. L313–L314.

*Primary Examiner*—Mark Bell
*Attorney, Agent, or Firm*—Frishauf, Holtz, Goodman & Woodward

[57] ABSTRACT

An infrared ray-transmitting glass composition for optical fibers consisting essentially of 28 mol % to 38 mol % of $BaF_2$, 2 mol % to 7 mol % of $GdF_3$ and 58 mol % to 69 mol % of $ZrF_4$, and optical fibers comprising said glass composition.

8 Claims, 19 Drawing Figures

GLASS FOR INFRARED RAY-TRANSMITTING OPTICAL FIBERS AND OPTICAL FIBERS FORMED FROM SAID GLASS

This is a division of application Ser. No. 226,716 filed Jan. 21, 1981.

This invention relates to an infrared ray-transmitting glass fiber material for permitting transmission of an infrared ray of a wavelength of 2 to 6 μm and a method for manufacturing glass fibers from the optical fiber material.

Conventionally, as an optical fiber material use is made of, materials which contain silicon dioxide ($SiO_2$) as a main component such as, for example, glass. In these materials, the wavelength region of a smaller transmission loss is restricted to a region from visible ray wavelength area of 0.6 to 1.7 μm to a near infrared ray area due to infrared ray absorption and Rayleigh scattering. However, no glass material is known which when used in the form of optical fibers can realize low loss in the infrared ray region of rays longer than 2 μm. Viewed from the standpoint of a material transparent to the infrared wavelength region, glass materials, such as a $BeF_2$-based glass or a $ZnCl_2$-based glass, mainly made of halides are known. Halide glass is transparent to a longer wavelength region than the $SiO_2$-based glass. Of the halide glasses, $BeF_2$-based glass is more toxic. The $BeF_2$ based glass and the $ZnCl_2$-based glass are deliquescent. They are unsuitable for use as highly reliable optical fiber material. A $ZrF_4$-$BaF_2$-NaF-based glass material and $ZrF_4$-$BaF_2$-$LnF_3$ (Ln stands for rare-earth fluoride)-based glass material, as well as $ZrF_4$-$BaF_2$-$ThF_4$-based and $ZrF_4$-$BaF_2$-$UF_4$-based material as disclosed in U.S. Pat. No. 4,141,741, are known as optical glass other than the $BeF_2$-based and $ZnCl_2$-based material. In the halide glass of U.S. Pat. No. 4,141,741, a practical problem arises due to the presence of a radioactive element such as Th and U. The same thing can be true of the above-mentioned other fluoride-based glass. In this case, however, these glasses are unstable against crystallization in the glass fiber drawing process and no homogeneous fiber without crystalline structure in the fiber can be obtained. Although glass for use as ordinary window glass or optical glass for use for a special application purpose is a multi-component glass, it can not be used for optical fiber material, because it is not stable against crystallization at the draw step of the glass fiber manufacturing process. That is, the range of the glass forming composition is fundamentally different from the composition range of the glass fiber material. The composition range of the glass fiber material, as well as a method for manufacturing a glass fiber from the above-mentioned glass material, has not been known up to this date.

It is accordingly the object of this invention to provide glass material for infrared ray-transmitting optical fibers which is transparent to an infrared ray of a wavelength of 2 to 6 μm and excellent as a glass fiber material and a method for manufacturing a glass fiber using the infrared ray-transmitting glass fiber material.

In order to attain the above-mentioned object, the glass material for the infrared ray-transmitting optical fiber material of this invention is made of a three-component material of a 28 mol% to 38 mol% $BaF_2$-2 mol% to 7 mol% $GdF_3$-58 mol% to 69 mol% $ZrF_4$ composition ratio. The method for manufacturing glass fibers from the infrared ray-transmitting optical fiber material of this invention comprises the step of mixing $BaF_2$, $GdF_3$ and $ZrF_4$ in a final composition ratio of 28 mol% to 38 mol%, 2 mol% to 7 mol% and 58 mol% to 69 mol%, respectively, melting the mixture to obtain a melt; casting the melt in a metal mold with a hollow section which is preheated at a temperature of 100° C. or more, but at a temperature less than the glass deformation temperature; annealing the melt in a metal mold to form a glass rod, said annealing step comprising heating the melt at a temperature of 200° C. or more, but at a temperature less than the glass deformation temperature, and allowing the heated glass rod to cool; removing the resultant glass rod from a metal mold and optically polishing it at both the ends and sides; and drawing the tip of glass rod under a weak tension, the draw step comprising heating the tip of the glass rod and drawing the tip of the heated glass rod under a fixed temperature. The optical fiber formed from the optical fiber material of the above-mentioned composition ratio can be transparent to an infrared ray of a wavelength of 2 to 6 μm and can theoretically have a low loss of $10^{-3}$ dB/Km at a wavelength of 3 to 4 μm. Furthermore, it is not toxic and excellent in durability against water attack. Where a single mode optical fiber is manufactured from the optical fiber material, the diameter of the optical fiber can be made as large as about 40 μm and it is possible to obtain a low-loss, large-capacity optical fiber which is easy to couple to the light source and whose splicing is easy. Where it is used jointly with a big-power chemical laser, such as a DF laser, having a wavelength of about 3.8 μm, the application to the power transmission with an infrared ray such as a laser pencil becomes possible.

The direct transmission of an infrared image can be performed by using an optical fiber bundle formed from the glass rod of this invention.

According to a method for manufacturing a glass fiber from the optical fiber material of this invention the glass rod can be drawn at a draw speed of 1 to 30 m per minute and under proper viscosity to obtain a homogeneous optical fiber of about 100 to 500 μm in diameter.

This invention can be more fully understood from the following detailed description when taken in conjunction with the accompanying drawings, in which.

One embodiment of this invention will be explained below by referring to the drawings.

Four samples of $BaF_2$-$GdF_3$-$ZrF_4$ glass materials of different composition ratio as shown in Table 1 were measured for the spectroscopic characteristic showing a relation of the transmission (%) to the wavelength ($\mu m$). As a result of measurement, the inventors have found that spectra as shown in FIGS. 1A to 1D are obtained for the samples 1 to 4, respectively.

TABLE 1

|  | No. | | | |
| --- | --- | --- | --- | --- |
|  | 1 | 2 | 3 | 4 |
| $BaF_2$ | 30 | 30 | 42 | 40 (mol %) |
| $GdF_3$ | 2 | 10 | 5 | — (mol %) |
| $ZrF_4$ | 68 | 60 | 60 | 60 (mol %) |

For these glass materials, the movement of the absorption edges of an ultraviolet region and infrared region resulting from the composition difference was hardly observed and a transmission of above 90% was measured at the wavelength of 0.35 $\mu m$ to 7.5 $\mu m$. The first sample in particular was obtained as follows. That is, a mixed powder of 2.32 g of $BaF_2$, 0.19 g of $GdF_3$ and 5 g of $ZrF_4$, totaling 7.51 g, was ground in a mortar, introduced it into a platinum crucible, and heated in an electric furnace at 900° C. for 30 minutes so that it is melted. Such a melting step should be effected in a temperature range of preferably 800° C. to 1000° C. For a temperature of less than 800° C. the mixture is not melted and for a temperature of 1000° C. or more $ZrF_4$ is sublimed and dissipated. Then, the melt was cast on a copper plate to obtain a plate-like glass block 0.7 mm to 3 mm thick. The glass block weighed 7.50 g. A glass material having a 30 mol% $BaF_2$-2 mol% $GdF_3$-68 mol% $ZrF_4$ composition ratio was thus obtained without substantial composition fluctuation resulting from volatilization. The glass material was optically polished and a sample of a rectangular parallelepiped 3×7×8 mm was measured for the refractive index $N_D$ and Abbe number $\gamma_D$, a sample of a rectangular parallelepiped 3×4×15 mm was measured for the thermal expansion coefficient, glass transition temperature and deformation temperature and a plate-like sample of 10×15×0.5 mm was measured for the spectroscopic characteristics.

As a result, the following was found. The refractive index $N_D$ was 1.5221; the Abbe number $\gamma_D$, 77.2; the thermal expansion coefficient $\alpha$, 155×10$^{-7}$; the glass transition temperature Tg, 296° C. and the deformation temperature Td, 308° C. As a result of measurement of the spectroscopic characteristic, it has been found that light is transmitted through the glass material in a relatively wide wavelength range of 0.3 $\mu m$ to 8 $\mu m$. For a glass material of different $BaF_2$-$GdF_3$-$ZrF_4$ composition ratio, glass blocks were manufactured by the same method using samples corresponding to respective marks on the solid line on the trigonal diagram of FIG. 2, except that for a composition including $ZrF_4$ of 70 mol% or more and $GdF_3$ of 10 mol% or more the mixture was heated and melted at 990° C. for 30 minutes. As a result, a glass block was obtained. In the abovementioned trigonal diagram, white marks o, triangular marks Δ and marks x corresponding to a transparent glass, partially devitrified glass and completely devitrified glass, respectively, show composition ratios. A range connecting together the marks Δ was able to be regarded as a glass forming region with glass in the partly devitrified state being as a limit of glass forming. For a comparison with the glass forming region of this invention, a glass forming region of a $BaF_2$-$LaF_3$-$ZrF_4$-based glass material of different composition ratio as reported by M. Poulain (A. Lecoq and M. Poulain. J.Non-Crystalline Solids. Vol. 34, P. 101, 1979) is indicated in a range as enclosed by the broken line in FIG. 2. From these regions it will be understood that the $BaF_2$-$GdF_3$-$ZrF_4$-based glass of this invention is wider in the glass forming region than the glass forming region of this reference. However, the glass forming region is often widely dependent upon the glass manufacturing method, in particular, upon a difference in the quenching speed of the sample and for a $BaF_2$-$LaF_3$-$ZrF_4$-based glass material, samples were manufactured in the same method as the method of this invention and its glass forming region was identified. As the samples use is made of those having four different composition ratios and weighed quantity as shown in Table 2.

TABLE 2

| No. | $BaF_2$—$LaF_3$—$ZrF_4$ (mol %) | $BaF_2$—$LaF_3$—$ZrF_4$ (g) |
| --- | --- | --- |
| 1 | 33—2—65 | 5.3—0.4—10 |
| 2 | 34—6—60 | 5.9—1.2—10 |
| 3 | 30—15—55 | 5.7—3.2—10 |
| 4 | 35—11—54 | 6.8—2.4—10 |

The samples were, after being weighed out, crushed and mixed in a mortar. Then, the mixture was introduced in a platinum crucible and heated in the electric furnace at 900° C. for 30 minutes so that it is melted. The melt was cast on a copper plate to obtain a plate-like glass material 0.7 mm to 2 mm thick. Of these glass materials, the first sample of a 33 mol% $BaF_2$-2 mol% $LaF_3$-65 mol% $ZrF_4$ composition ratio showed a thermal expansion coefficient $\alpha$ of 177×10$^{-7}$, a glass transition temperature Tg of 294° C. and a glass deformation temperature Td of 302° C., and the second sample of a 34 mol% $BaF_2$-6 mol% $LaF_3$-60 mol% $ZrF_4$ composition ratio showed a refractive index $N_D$ of 1.5256, a thermal expansion coefficient $\alpha$ of 173×10$^{-7}$, a glass transition temperature Tg of 304° C. and a glass deformation temperature Td of 320° C. The marks corresponding to the composition ratios of the first and second samples are indicated by the dotted marks ⊙ on the trigonal diagram of FIG. 2, and it has been confirmed that these dotted marks are present in the glass forming region of M. Poulain. However, for the third sample of a 30 mol% $BaF_2$-15 mol% $LaF_3$-55 mol% $ZrF_4$ composition ratio and fourth sample of a 35 mol% $BaF_2$-11 mol% $LaF_3$-54 mol% $ZrF_4$ composition ratio, crystalline grains were developed in the greater portion of the glass material. Those points corresponding to the composition ratios of the third and fourth samples are indicated by marks × on the trigonal diagram of FIG. 2 and it has been found that the above-mentioned marks × is outside the glass forming region of M. Poulain. From the above it will be understood that a result of the follow-up tests by the inventors agrees with the result of M. Poulain in respect of their glass forming region. It has been found that, even if the manufacturing method of M. Poulain is different from the manufacturing method of this invention, the glass forming region is determined by the composition ratio of the sample. The values of the physical properties of the $BaF_2$-$GdF_3$-$ZrF_4$-based glass material so obtained are shown on the trigonal diagram.

Figure 3:
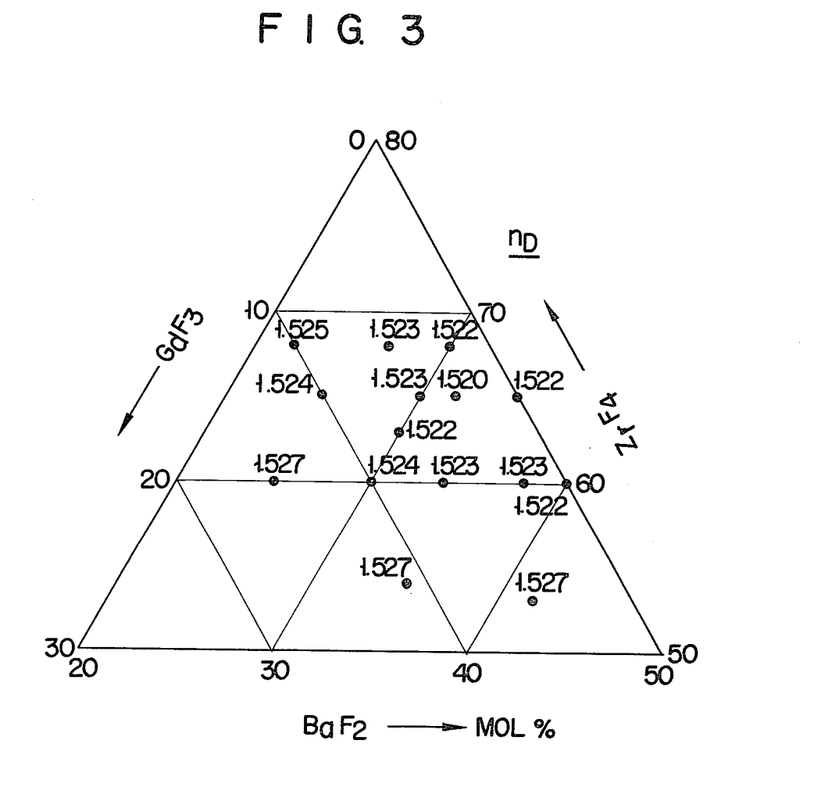
FIG. 3 is a trigonal diagram showing the relationship between refractive indices and composition of the $BaF_2$-$GdF_3$-$ZrF_4$-based glass system of different composition ratio.

FIG. 3 shows a difference in refractive index of the glass material of different composition ratio. As evident from FIG. 3, the refractive index $N_D$ is within a range of 1.520 to 1.530 and the refractive index becomes lower as the content of $ZrF_4$ is increased and becomes higher as the contents of $GdF_3$ and $BaF_2$ are increased.

Figure 4:
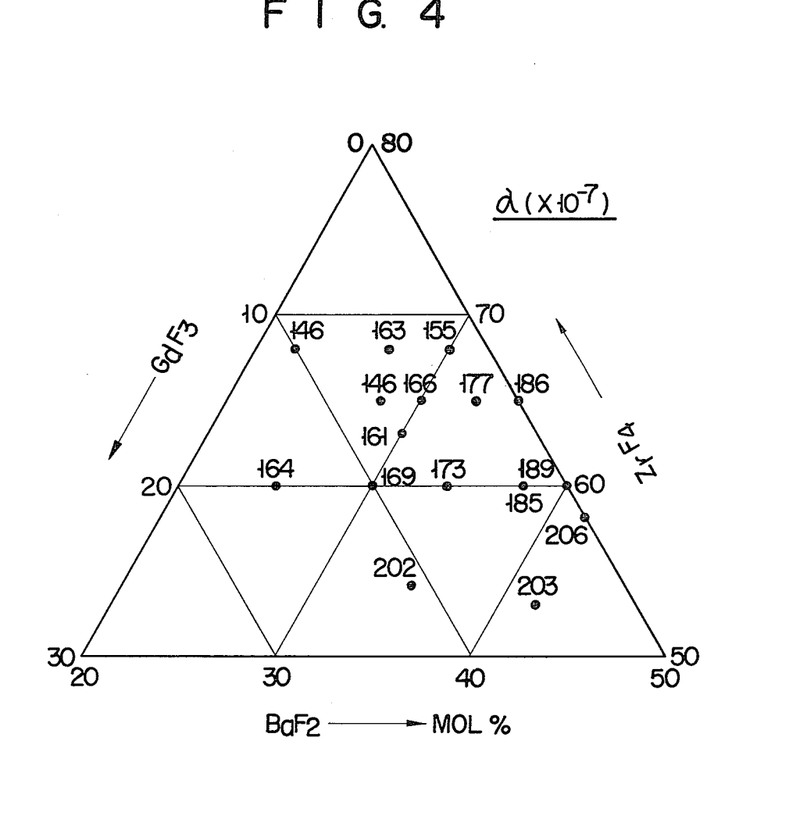
FIG. 4 is a trigonal diagram showing the relationship between thermal expansion coefficients and the composition of the $BaF_2$-$CdF_3$-$ZrF_4$-based glass system of different composition ratio which is useful in explaining the embodiment of this invention.

FIG. 4 shows a difference in thermal expansion coefficient $\alpha$ of the glass materials of different composition ratios. The coefficient of thermal expansion is decreased with an increase in the content of $ZrF_4$ and decreased with an increase in the content of $GdF_3$. Glass rods are easier to manufacture, the lower the thermal expansion coefficient. When the glass material for the fluoride glass fiber contains larger amounts of $ZrF_4$ and $GdF_3$, the coefficient of thermal expansion is increased. Consequently, less attention has to be given to fragmentation at the fiber drawing step resulting from rapid temperature change.

Figure 1A:
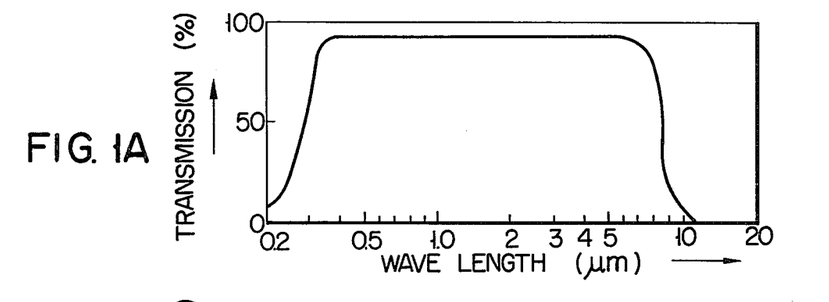
FIG. 1A to 1D are the optical spectra of each sample of glass materials of different composition ratio which is useful in explaining the embodiment of this invention.
Figure 1B:
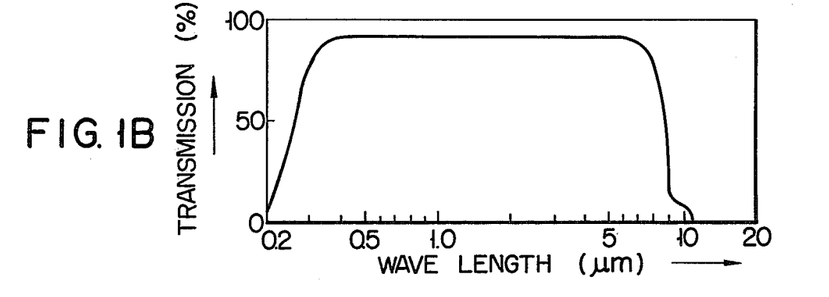
Figure 1C:
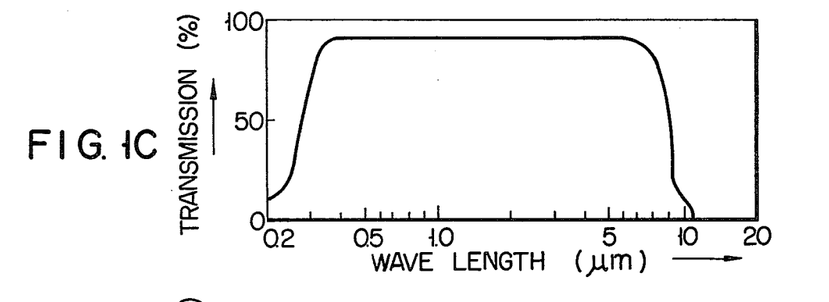
Figure 1D:
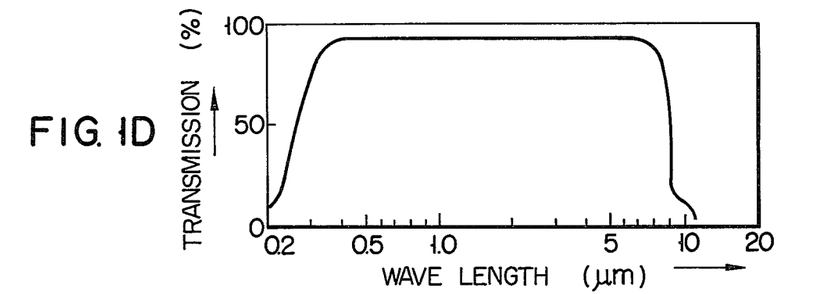
Figure 2:
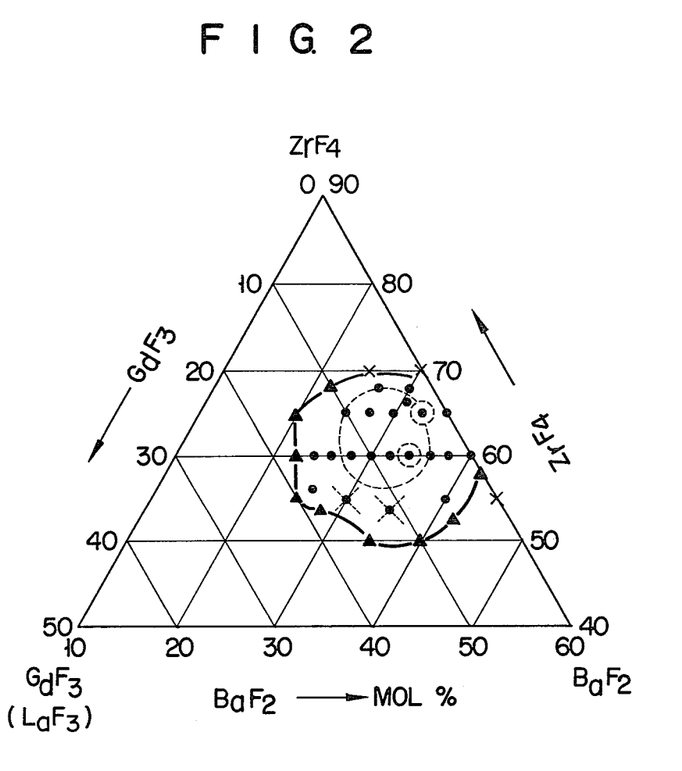
FIG. 2 is a trigonal diagram showing the relation of a glass forming range of a $BaF_2$-$GdF_3$-$ZrF_4$-based glass material to that of a conventional $BaF_2$-$LaF_3$-$ZrF_4$-based glass material.
Figure 5:
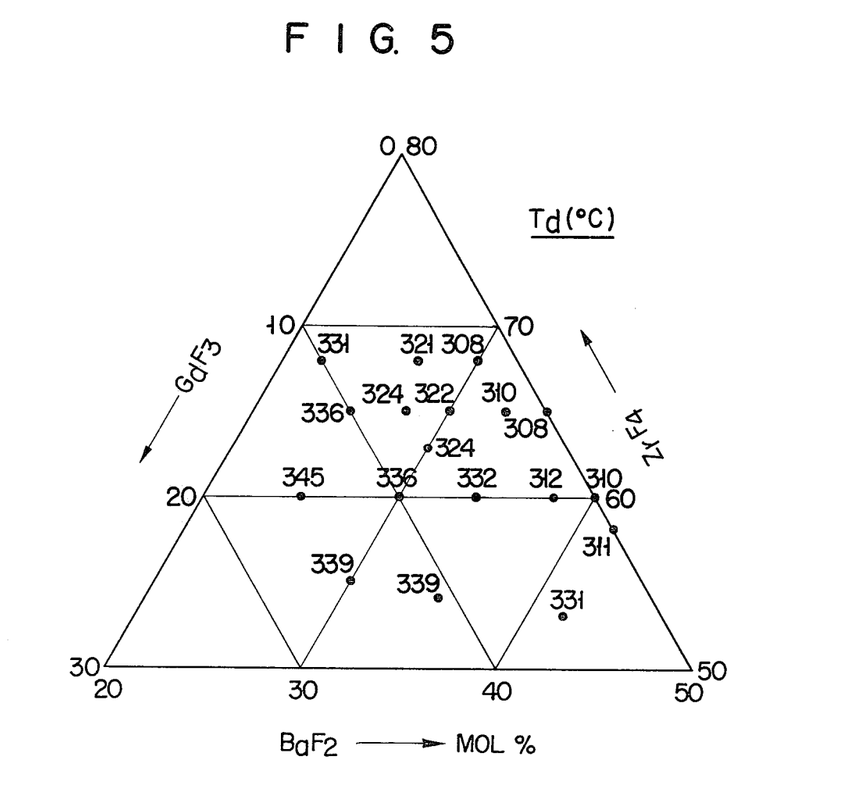
FIG. 5 is a trigonal diagram showing the relationship between the deformation temperatures and the composition of the $BaF_2$-$GdF_3$-$ZrF_4$-based glass system which is useful in explaining the embodiment of this invention.
Figure 6:
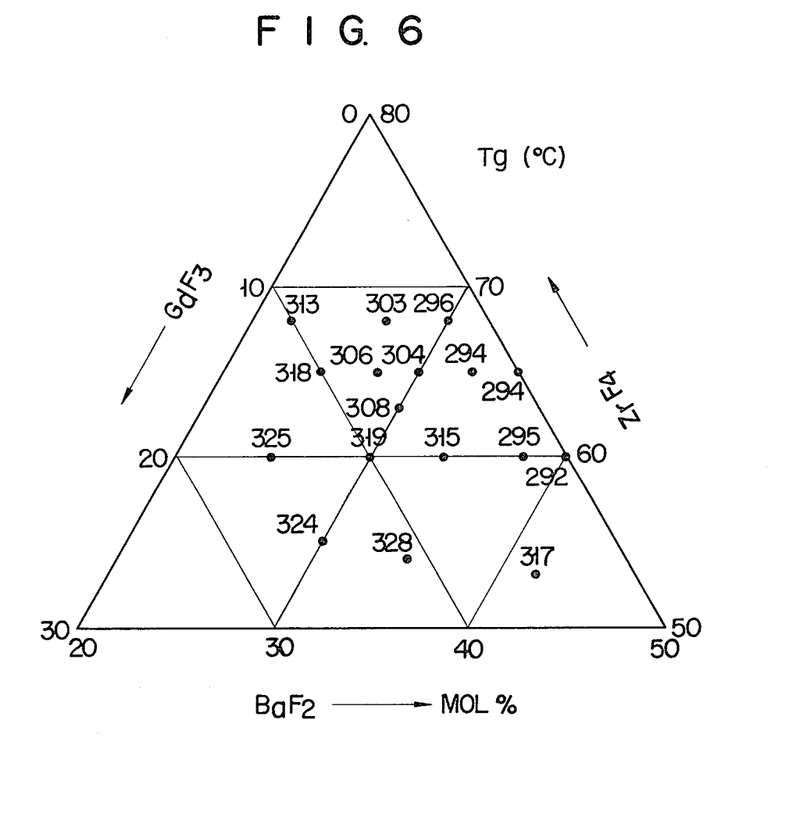
FIG. 6 is a trigonal diagram showing the relationship between the glass transition temperature and the composition of the $BaF_2$-$GdF_3$-$ZrF_4$-based glass system of different composition ratio which is useful in explaining the embodiment of this invention.
Figure 7:
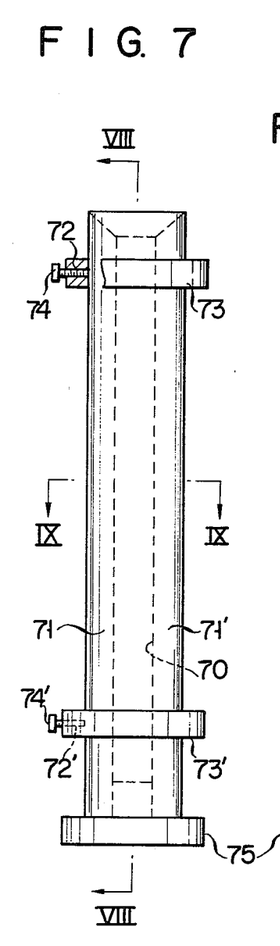
FIG. 7 is a front view diagrammatically showing a mold, partly in cross section, as used in a method of this invention.
Figure 8:
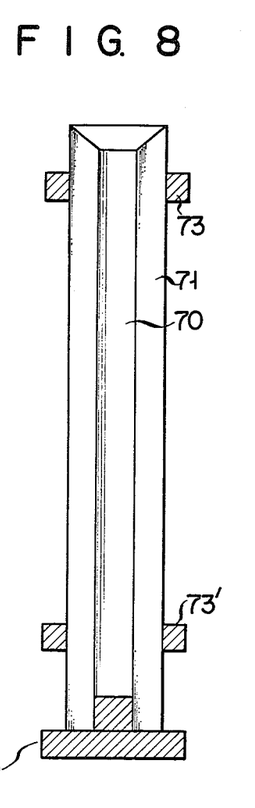
FIG. 8 is a cross-sectional view as taken along VIII to VIII of FIG. 7.
Figure 9:
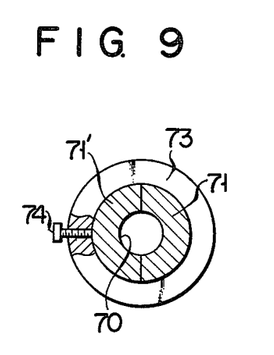
FIG. 9 is a cross-sectional view as taken along IX—IX of FIG. 7.

FIG. 5 shows a difference in deformation temperature Td(°C.) of glass materials of different composition ratios. The temperature variation of the glass materials is smaller than that of oxide glass and the deformation temperature is distributed within a range of 300° C. to 340° C. The more the contents of $GdF_3$ and $BaF_2$ the higher the deformation temperature. The deformation temperature is lowered with an increase in $ZrF_4$. This tendency is also observed in the distribution of the glass transition temperature of the glass materials of different composition ratios. Since the glass materials have such lower glass deformation temperature and glass transition temperature, there is an advantage of being capable of drawing an optical fiber from the glass material at lower temperatures during the manufacture of an optical fiber. Also, there is less thermal fluctuation of refractive indices. For the $BaF_2$-$GdF_3$-$ZrF_4$-based glass materials of the composition ratios as shown in Table 1 a transmission of above 90% was measured in a region of the wavelength of 0.35 $\mu$m to 7.5 $\mu$m as already set out above. From the above explanation it is appreciated that in the glass forming region of the trigonal diagram of FIG. 2 the $BaF_2$-$GdF_3$-$ZrF_4$-based glass material of this invention is fit as the glass fiber material. In the actual manufacture of a glass fiber from the glass fiber material, however, it is necessary that the glass fiber material should not be crystallized during the glass fiber drawing step. If a glass fiber is drawn by an ordinary known zone melting method, it is necessary to form a round glass rod of a predetermined diameter. In an embodiment which follows, the optical fiber material of the glass forming range as shown in FIG. 2 can be manufactured as a glass rod of 7 mm in diameter by above 100 mm in length. Now, the composition range of the glass material which withstands the crystallization and fragmentation will be given below. A 6.1 g $BaF_2$-0.75 g $GdF_3$-13.0 g $ZrF_4$-based glass material corresponding in weight to the 30 mol% $BaF_2$-3 mol% $GdF_3$-67 mol% $ZrF_4$-based glass material was selected from the glass forming range as shown in FIG. 2 and a mixed powder sample was prepared. The mixed powder sample was introduced into a platinum crucible and heated at 950° C. for 30 minutes so that it is melted. The melt was cast into a mold preheated at 280° C. for above 1 hour, annealed at 280° C. for 4 hours, and allowed to cool. After being allowed to stand for 12 hours, the mold was opened and a glass rod obtained. The mold is comprised of a pair of mold halves 71, 71' and has a hollow cylindrical section 70 as shown in FIGS. 7 to 8. The mold halves 71, 71' are mated by fitting rings 73 and 73' one at each longitudinal end portion of the mold and threading screws 74 and 74' into the screw holes 72 and 72' of the rings 73 and 73', respectively. By so doing, a hollow cylindrical section 70 is formed. A bottom fitting 75 having a projection is fitted over an opening of one longitudinal end of the mold to prevent a melt from flowing out after the melt is cast into the cylindrical hollow section of the mold.

The above explanation has been directed to the embodiment using a brass mold. In the embodiment in which gold is vapor deposited on the inner surface of the brass mold, the mold halves are preheated at 280° C. for above 1 hour. The preheating temperature of the mold is preferably in a range of 100° C. to a temperature less than the glass deformation temperature. For the preheating temperature of less than 100° C., the glass material tends to fragment due to a greater thermal expansion coefficient of the glass. When the preheating temperature is above the glass deformation temperature, there is a possibility of the glass material being devitrified. As a mixed powder sample a 4.85 g $BaF_2$-0.99 g $GdF_3$-10 g $ZrF_4$-based glass material corresponding in weight to the 30 mol% $BaF_2$-5 mol% $GdF_3$-65 mol% $ZrF_4$-based glass composition was selected from the glass forming region of FIG. 2. The mixed powder was introduced into the platinum crucible and heated at 950° C. for 30 minutes so that it is melted. The melt was cast into the preheated brass mold whose internal surface was coated with gold by vapor deposition, and annealed at 280° C. for 4 hours. For an annealing temperature of less than 200° C. it undesirably takes a longer time to anneal the glass material. If the annealing temperature is above the deformation temperature, there is a risk of the glass material being devitrified. Thereafter, the mold is allowed to cool. After being allowed to stand for 12 hours, the mold was opened and a glass rod obtained. The glass was easily released from the mold and the mold was able to withstand a repetitive use of several times. A similar effect is also obtained with a mold whose inner surface was similarly coated with silver. Gold can be evaporated and vapor deposited on the inner surface of a copper mold or an iron mold.

Figure 10:
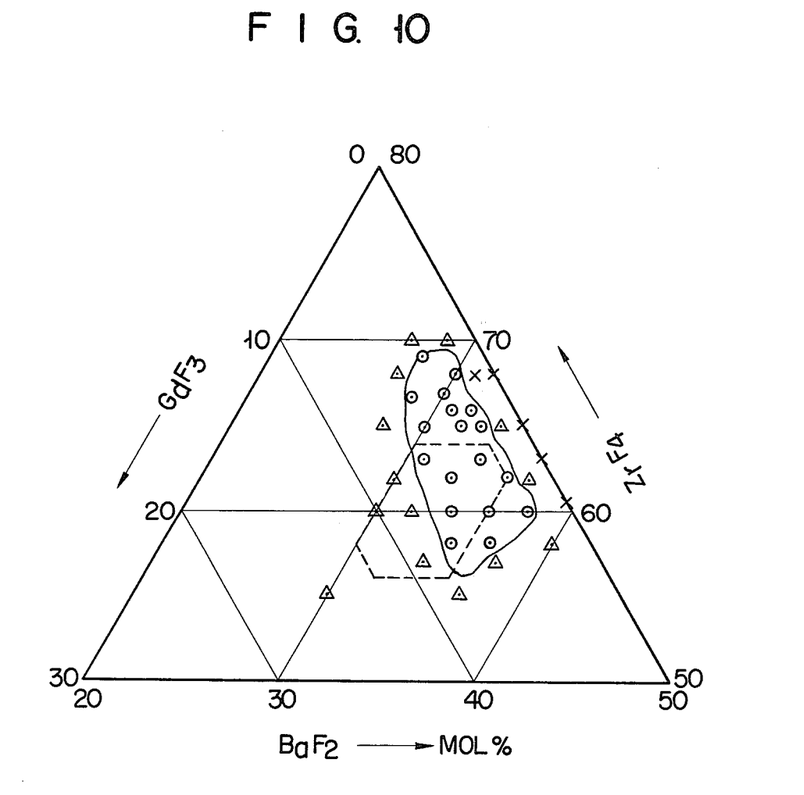
FIG. 10 is a trigonal diagram showing the glass composition range of the $BaF_2$-$GdF_3$-$ZrF_4$-based system of different composition ratio as used in this invention and the glass forming region of a conventional $ZrF_4$-$LnF_3$-$BaF_2$ (Ln stands for a rare-earth element)
Figure 11:
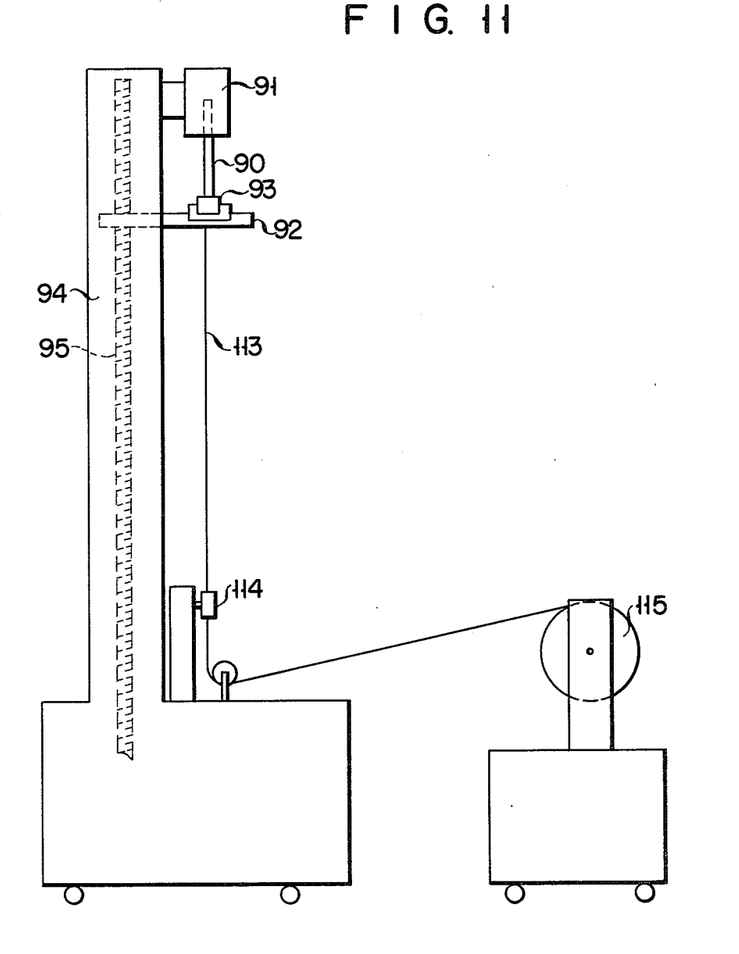
FIG. 11 is a diagrammatic view showing an apparatus for manufacturing an optical fiber from an infrared-transmitting optical fiber material of this invention.
Figure 12:
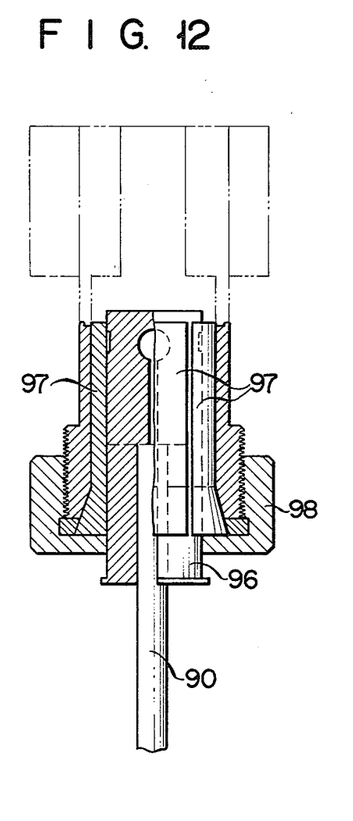
FIG. 12 is an enlarged, diagrammatic view showing a glass rod support mechanism of FIG. 11.
Figure 13:
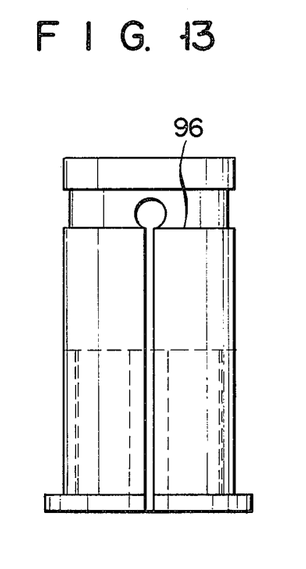
FIG. 13 is a side view showing a collet as shown in FIG. 12.
Figure 14:
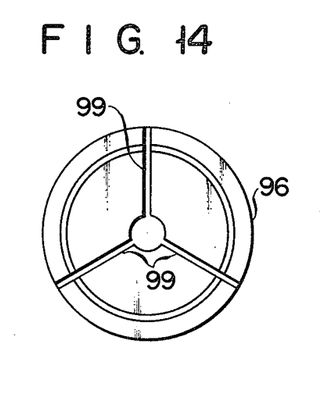
FIG. 14 is a plan view showing the collet of FIG. 13 as viewed in a direction indicated by an arrow.
Figure 15:
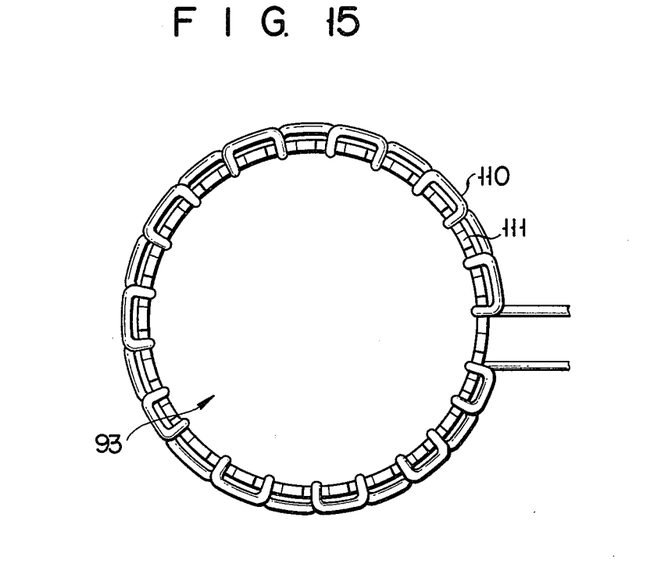
FIG. 15 is a front view showing an electric furnace (hereinafter referred to as a platinum furnace) using platinum as a heater shown in FIG. 11.
Figure 16:
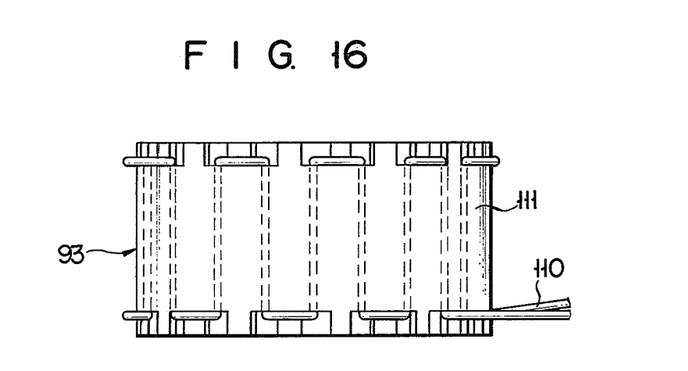
FIG. 16 is a side view of the electric furnace using platinum as a heater shown in FIG. 11.

Glass rods were manufactured by the above-mentioned manufacturing method using the brass mold halves, whose inner surface was coated with gold, using samples of the $BaF_2$-$GdF_3$-$ZrF_4$-based glass materials of different composition ratio. FIG. 10 shows the glass forming range of these glass materials on the trigonal diagram. On the trigonal diagram, the marks ⊙ shows homegeneous glass rods obtained; the marks △, glass rods including fragmentation or chap and crystallites and the marks x, the glass rods including the devitrified part. The solid line on the trigonal diagram shows a composition range fit as the optical fiber material. In this range, $BaF_2$ is 28 mol% to 38 mol%, $GdF_3$, 2 mol% to 7 mol% and $ZrF_4$, 58% to 69 mol%. This composition range is narrower than the glass forming region on the trigonal diagram of FIG. 2. This shows that the glass forming range does not always agree with a range where after the glass rod has been manufactured it can be used as a proper glass rod material. FIG. 10 shows in the dotted line a glass forming range of the $BaF_2$-$LnF_3$-$ZrF_4$-based glass as disclosed, for example, in the above-mentioned U.S. Pat. No. 4,141,741. Of the glass forming region as shown in dotted lines, a range of, for example, the 30 mol% $BaF_2$-10 mol% $GdF_3$-60 mol% glass material or the 34 mol% $BaF_2$-9 mol% $GdF_3$-57 mol% $ZrF_4$-based glass material is found to involve scattering of crystallites in the glass rod, when observed after the manufacture of the glass rods. This range is found unsuitable for obtaining glass fiber materials. The glass rod of the $BaF_2$-$GdF_3$-$ZrF_4$-based glass material of the composition range of this invention, after being removed from the mold as shown in FIG. 7, optically polished on all faces, thus obtaining a cylindrical glass rod of 7.1 mm in diameter by 110 mm in length. The glass rod is drawn, by a drawing facility (FIG. 11), into optical fibers. As shown in FIG. 11, the glass rod is held such that it is located at the center of a platinum furnace 93 with one end of the glass rod fixed to a rod support mechanism 91. The rod support mechanism 91 is supported on a standard 94 and the platinum furnace support 92 is vertically movable through a gear mechanism 95 in the longitudinal direction of the standard. The rod support mechanism 91 includes, as shown in FIG. 12, a collet 96 by which the end of the glass rod 90 is circumferentially held, a chuck 97 surrounding the outer periphery of the collet 96 and a nut 98 which serves as a fitting member for clamping the outer periphery of the chuck 97. The glass rod 90 is inserted into the collet 96 and the chuck 97 is tightened by the nut 98. As a result, the glass rod 90 is tightened through the chuck 97 to hold it in place. The collet 96 is made of, for example, Teflon [poly(tetrafluoroethylene-co-hexafluoropropylene)] and has three longitudinal slits 99 which perform their function when the chuck is tightened up. As shown in a plan view of FIG. 15 and in a side view of FIG. 16, the platinum furnace 93 as shown in FIG. 11 is so formed that a platinum wire 110 of 0.5 mm$\phi$ in diamter by 300 mm in length is wound on a thermostable material 111 made of quartz glass. In the platinum furnace 93 the tip of the glass rod 90 fixed to the rod support mechanism 91 is located at the center by adjustably and vertically moving by the gear mechanism 95 along the longitudinal direction of the standard. A weight of 1 g is suspended from the forward end of the glass rod 90 using a platinum wire of 0.2 mm$\phi$ in diameter and 200 mm in length. In this case, the tension is preferably 1.0 mg/mm$^2$ to 50 mg/mm$^2$. For a tension of less than 1.0 mg/mm$^2$, the temperature of the glass rod has to be fairly increased so as to permit the tip of the glass rod to be drawn downward as a glass fiber. This involves a risk of the glass rod being devitrified. For a tension in excess of 50 mg/mm$^2$ an optical fiber as obtained from the glass rod becomes ellipsoidal in cross-section or is broken. Then, the platinum furnace 93 is raised in temperature to 300° C. and is held at that temperature for 20 minutes. Then the glass rod temperature is raised from about 300° C. at a temperature rise speed of 1° C./min to 5° C./min, and at the appropriate temperature the end of the glass rod is drawn downward, while being melted. At this time, the temperature of the platinum furnace 93 is fixed. At the time when the glass rod 90 is drawn into a glass fiber of about 100 μm in outer diameter, the tip of the fiber is drawn at a draw speed of 1 m/min to 30 m/min by a capstan 114 as shown in FIG. 11 and the glass fiber so formed is wound on a takeup drum 115. It has been microscopically confirmed that the glass fiber so obtained is very homogeneous free from crystallites and imperfections.

What we claim is:

1. An infrared ray-transmitting glass composition for optical fibers consisting essentially of 28 mol% to 38 mol% of $BaF_2$, 2 mol% to 7 mol% of $GdF_3$ and 58 mol% to 69 mol% of $ZrF_4$.

2. The glass material of claim 1 consisting essentially of 30 mol% $BaF_2$, 2 mol% $GdF_3$, and 68 mol% $ZrF_4$.

3. The glass material of claim 1 consisting essentially of 30 mol% $BaF_2$, 3 mol% $GdF_3$, and 67 mol% $ZrF_4$.

4. The glass material of claim 1 consisting essentially of 30 mol% $BaF_2$, 5 mol% $GdF_3$, and 65 mol% ZrFHd 4.

5. A glass optical fiber having superior infrared ray-transmitting characteristics consisting essentially of the glass composition of claim 1.

6. A glass optical fiber having superior infrared ray-transmitting characteristics consisting essentially of the glass composition of claim 2.

7. A glass optical fiber having superior infrared ray-transmitting characteristics consisting essentially of the glass composition of claim 3.

8. A glass optical fiber having superior infrared ray-transmitting characteristics consisting essentially of the galss composition of claim 4.

* * * * *